March 27, 1928.
H. R. GUNDLACH
BITUMINOUS EMULSION
Filed April 25, 1923
1,663,652
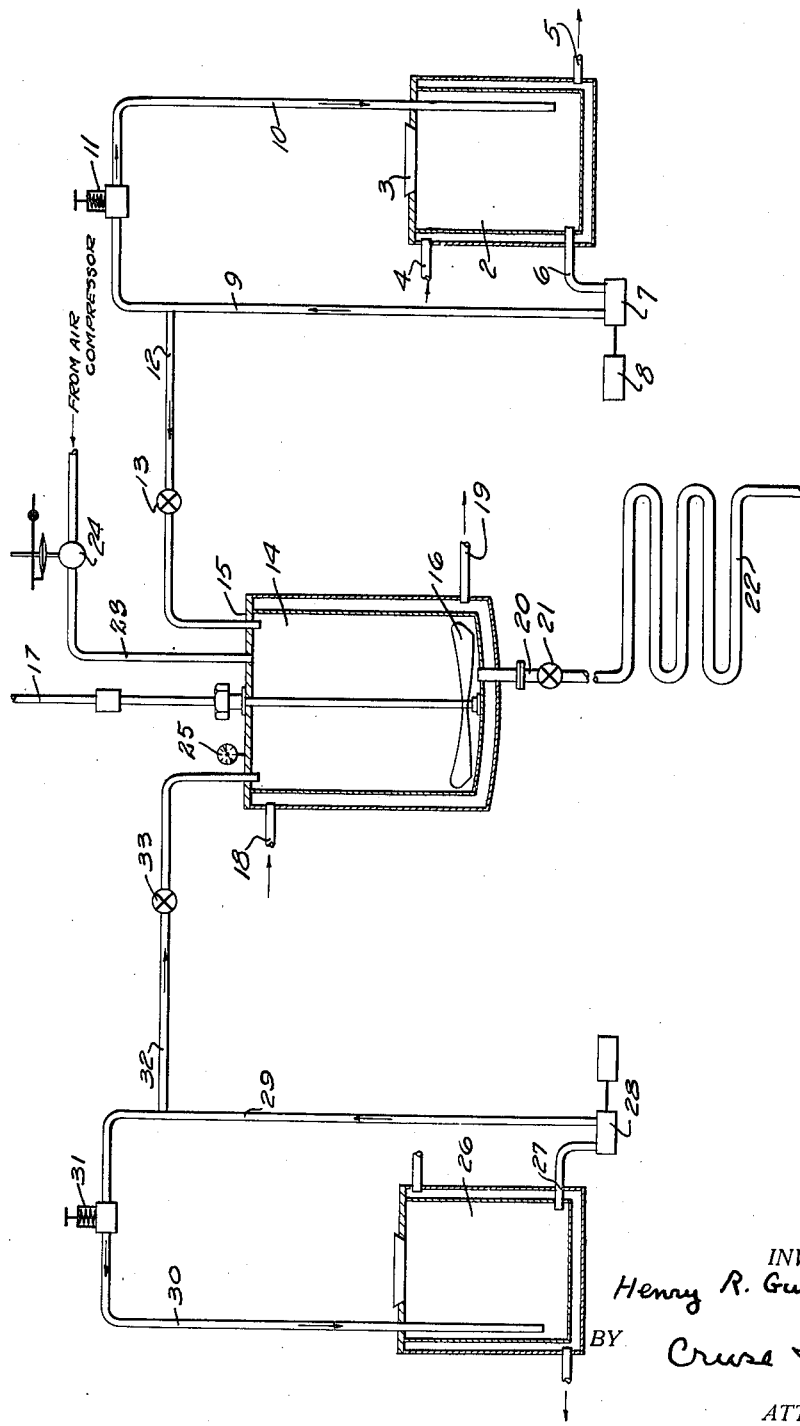
INVENTOR
Henry R. Gundlach
BY
Cruse + Mann
ATTORNEYS Patented Mar. 27, 1928.

1,663,652

UNITED STATES PATENT OFFICE.

HENRY R. GUNDLACH, OF BALTIMORE, MARYLAND, ASSIGNOR TO THOMAS OIL BY-PRODUCTS COMPANY, A CORPORATION OF NEW JERSEY.

BITUMINOUS EMULSION.

Application filed April 25, 1923. Serial No. 634,641.

My invention relates to a process for making bituminous emulsions, and by its use I am able to make emulsions having distinct and improved qualities as compared with those that have heretofore been made.

A number of processes have been suggested for making bituminous emulsions, but all of these have been limited to the treatment of relatively soft materials and materials having a relatively low melting point. By my process I have, for the first time, succeeded in making satisfactory emulsions of bituminous material having a relatively high melting point and showing a relatively low penetration under the standard tests. Such emulsions have many qualities and advantages not inherent in the softer materials, and by my discovery of a method of producing them, new fields of use for bituminous emulsions are opened.

In order to assist in illustrating a manner in which my process may be carried out, I show in the accompanying drawings a diagrammatic representation of a form of apparatus that can be used for carrying out the same.

Referring to these drawings, 2 is a jacketed kettle having a manhole cover 3. Steam or oil, or other heating medium, may be admitted into the jacket through a pipe 4 and withdrawn through the pipe 5. The kettle 2 is used for preheating a mixture of water and a colloidal material such as clay.

Extending out from the bottom of kettle 2 is a pipe 6 connected to the intake of a pump 7 which may be driven by a motor indicated at 8. The discharge from the pump 7 is through the pipe 9 which has a return 10 which re-enters the tank 2. A pressure relief valve 11 is positioned in the pipe 9 and controls the pressure in the return pipe 10 and therefore controls the pressure in the tank 2. Extending from pipe 9 on the high pressure side of valve 11 is pipe 12 which is provided with a gate valve 13. The pipe 12 enters the steam jacketed mixing kettle 14 which is provided with a cover 15 and a mixing vane or agitator 16 which is driven from any suitable source of power by shaft 17. The tank 14 has a pipe 18 for admitting a heating medium into the jacket and a discharge pipe 19 for such heating medium. Extending from the bottom of tank 14 is discharge pipe 20 which may be provided with gate valve 21 and may connect with a cooling coil 22. A pipe 23 extends into the tank 14 preferably through the cover and is provided with a pressure regulating valve 24. The pipe 23 is connected with an air compressor not shown. The tank 14 likewise may be provided with a pressure gauge 25. The bituminous material to be emulsified is heated in a jacketed kettle 26 similar to the kettle 2. Kettle 26 has an outlet pipe 27 connected to a pump 28 which discharges through a pipe 29 which connects with a return 30 and is provided with a pressure relief valve 31. Pipe 32 is connected to pipe 29 on the high pressure side of valve 31 and is provided with a gate valve 33. Pipe 32 enters the tank 14 through the cover 15.

Operation of my process may be understood from the following illustrative examples:

Bituminous material having a melting point of 300° F. (Ring and Ball method), was put in tank 26; steam was passed through the jacket of this tank, heating the contents to a temperature of about 600° F. At the same time a mixture of water containing about 30% of clay held in colloidal suspension was placed in kettle 2 and heated to a temperature of about 200° F. Compressed air was forced into the tank 14 until the pressure reached 130 pounds (gauge pressure) and at the same time steam at a temperature of 340° F. was admitted into the jacket through pipe 18 and agitator 16 was started in motion. Pumps 7 and 28 were then started in operation until a pressure of about 135 pounds (gauge pressure) was developed in pipes 9 and 29, the pressure valves 11 and 31 being set to hold the pressure slightly above this figure. The material was allowed to circulate for a time through return pipes 10 and 30 respectively so that even heating of the materials was assured; valves 13 and 33 were then opened, permitting the water-clay mixture and the melted bitumen to enter tank 14, where they were mixed and agitated together by the action of the vane 16. After kettle 14 was about two-thirds filled with these materials, which were mixed in substantially equal quantities, valves 13 and 33 were closed and agitation continued for a few minutes.

It is to be noted that the air pressure in tank 14 was maintained at a point higher than the steam pressure corresponding to the temperature of the water in tank 14, so that boiling or evaporation of the water was prevented even though a temperature very much in excess of the normal boiling point of water was used. In general, it is desirable to maintain this pressure about 10 pounds higher than the theoretical steam pressure at the temperature used, so that if steam is generated by local action at the time the water strikes the hot bitumen, it will condense and return to the compound as soon as the temperature of the mass becomes uniform. This outside pressure permits the treatment of material having a high melting point and also permits of maintaining the correct proportions of various ingredients in the mixture and permits of a uniform temperature control.

After the emulsion was thoroughly mixed, inflow of air through pipe 23 was stopped and valve 21 opened slightly so that the material in tank 14 was forced slowly out by the pressure of the air in the tank. The material, partially cooled in coil 22, was drawn off into a tank where it was allowed to cool further, and was found to have the consistency of wet mud.

The material thus produced was readily compounded with inert material such as wood flour or paper pulp and when dried under heat and pressure, produced a hard substance of even texture which took a good finish from the molds. It showed zero penetration at 77° F.

In another example bituminous material of 160° F. melting point (Ring and Ball method) and having a penetration of 23 at 77° F. was placed in kettle 26 and heated to a temperature of about 300° F. A suspension of 30 parts by weight of clay to 70 parts by weight of water was then placed in kettle 2 and heated to a temperature of 140° F. The pressure in kettle 14 was then raised to 7 pounds per sq. in. (gauge pressure) and after the bituminous matter and the clay suspension had been circulated so that they were uniformly heated, equal quantities of bituminous matter and the clay suspension were forced into kettle 14 which was maintained at a temperature of about 200° F. Agitator 16 was kept in operation as the materials entered this kettle, and at the end of five minutes valves 13 and 33 having been closed, valve 21 was opened and the mixture was drawn off through cooling coil 22. The resulting product, while not as hard as that obtained in the first example, was readily compounded with paper pulp, and the compound when dried under heat and pressure produced a material of even texture which also took a good finish from the molds, and showed substantially the same melting points and penetration as the bituminous material from which it was made.

As far as my experience has gone, the top limit of material that can be treated in accordance with my process depends only on the pressures which the apparatus will stand and the temperature to which the heating agent used in the kettle jackets can be raised.

What I claim is:

1. In the manufacture of bituminous emulsions, the step of mixing a melted bitumen and a colloidal suspension in a closed vessel in which the pressure is maintained above atmospheric and above the pressure of saturated steam at a temperature corresponding to the temperature of the resulting mixture.

2. A process as defined in claim 1, in which such pressure is maintained by the use of compressed air.

3. In the manufacture of bituminous emulsions, the step of mixing a melted bitumen and a colloidal suspension in a closed vessel in which the pressure is maintained above atmospheric and about 10 pounds above the pressure of saturated steam at a temperature corresponding to the temperature of the resulting mixture.

HENRY R. GUNDLACH.